United States Patent [19]
Abe et al.

[11] 3,956,222
[45] May 11, 1976

[54] POLYVINYL CHLORIDE PASTE COMPOSITIONS

[75] Inventors: Hiroshi Abe, Okayama; Koichi Kazitani; Koichi Saito, both of Kurashiki; Hisashi Nakamoto, Hayashima, all of Japan

[73] Assignee: Kuraray Co., Ltd., Kurashiki, Japan

[22] Filed: Mar. 22, 1974

[21] Appl. No.: 453,821

[30] Foreign Application Priority Data
Mar. 22, 1973  Japan.................................. 48-33306

[52] U.S. Cl........................ 260/32.6 R; 260/31.8 G; 260/31.8 H; 260/33.8 UA; 260/34.2; 260/899
[51] Int. Cl.²........................ C08J 3/08; C08K 5/02; C08K 5/20; C08L 27/06
[58] Field of Search............ 260/32.6 R, 876 R, 899, 260/33.8 UA, 34.2, 31.8 G, 31.8 H

[56] References Cited
UNITED STATES PATENTS
3,816,170  6/1974  Mudde................................ 260/899

Primary Examiner—Allan Lieberman
Attorney, Agent, or Firm—Bacon & Thomas

[57] ABSTRACT

A polyvinyl chloride paste composition exhibits enhanced characteristics of fluidity, pot life, adhesiveness to substrate materials and workability, by incorporating therein a low molecular weight N-substituted acrylamide polymer comprising the acrylamide recurring unit having the structural formula:

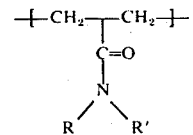

wherein R and R' are either hydrogen or lower alkyl having from 1 to 4 carbon atoms, and wherein R and R' together cannot both be hydrogen.

10 Claims, No Drawings

POLYVINYL CHLORIDE PASTE COMPOSITIONS

BACKGROUND OF THE INVENTION

1. Field of the Invention

The present invention relates to improved compositions comprising polyvinyl chloride resin and, more especially, relates to improved paste compositions comprised of said polyvinyl chloride [PVC] resin and which paste compositions are characterized by enhanced fluidity, longer pot lives, enhanced adhesive properties, and markedly improved workability attributes.

2. Description of the Prior Art

Various paste compositions comprising a polyvinyl chloride resin are well known in the art and are widely used on an industrial basis for the coating of certain substrates, such as textiles, paper, and steel, and which also have been utilized for the preparation of certain films and a variety of other molded articles, for example, by rotational casting, spread-coating, spraying, dipping, slushing, and the like. Representative products thus produced consistent with the immediately aforesaid comprise the vinyl leathers, polyvinyl chloride resin coated steel plates, waterproof canvases, coated textiles and cloths, industrial gloves, printing rolls, shoe soles, various foamed articles, dolls, cushions, and the like.

Typically, however, the workability of the known PVC paste compositions is controlled merely by adjusting the various viscosities thereof. It is therefore of course required that the given polyvinyl chloride paste composition exhibit the proper fluidity for the particular paste treatment or application contemplated [which proper fluidity usually iss synonomous with lower viscosity] and it is also required that any change in said fluidity upon passage of a given period of time be slight [or, in other words, the paste must have a relatively long pot life].

Furthermore, the degree of adhesion or adhesiveness of the PVC resin to a given base substrate is also quite important, since in many instances such paste compositions are used for the purpose of applying polyvinyl chloride resin to the surfaces of various textiles and cloths, papers, metals and/or plastics. And it should additionally be borne in mind that various high frequency welding techniques, e.g., ultrasonic bonding, have been used to adhere laminae comprised of the vinyl chloride resins. From this point of view, the degree of adhesiveness of a polyvinyl chloride layer to its intended substrate material, as well as the degree of cohesiveness of the polyvinyl chloride resin itself, too are quite significant.

It is also well known in the art that the fluidity of a given polyvinyl chloride paste composition can be improved [or its viscosity decreased] by adding to the composition substantial amounts of an inert diluent such as trichloroethylene ["trichlene"]. However, such a method for improving the fluidity characteristics of the selected PVC paste composition suffers from the fatal defect, because of the highly volatile nature of the diluent, of giving rise to the evolution of highly noxious vapors and, hence, is highly unsanitary and ambient polluting. Moreover, the aforementioned change in fluidity of such a paste or the increase in the viscosity thereof over a given period of time is objectionally large.

It has also been proposed to improve the fluidity of the polyvinyl chloride paste compositions by adding thereto certain surface activators comprising certain derivatives of the polyhydric alcohols. Compare U.S. Pat. No. 2,657,186 to Klein et al. However, such additives are to a large extent incompatible with polyvinyl chloride and, accordingly, characteristically bleed out of paste compositions of this type. Moreover, such additives concomitantly effect a decrease in the adhesive properties of the polyvinyl chloride paste.

It is similarly known in the art that upon the formulation of a given paste, same should not become swollen or expanded by any plasticizer or solvent content thereof during or upon storage. Contrariwise, at the point in time of the intended use of such paste compositions, it is of course preferred that same be readily, uniformly swollen or expanded to form a more workable gel phase. But, since the aforesaid requirements can be said to be inconsistent or even mutually exclusive, the art is accordingly replete with various efforts compromising the noted requirements and seeking to arrive at any happy medium. Unfortunately, however, such truly satisfactory alternative has yet to be determined. And, thus, under the circumstances above outlined, the various paste compositions, per se, the conditions for the preparation or formulation thereof, the conditions under which the same are aged, and the conditions for the utilization or working thereof, are presently merely selected experimentally, depending upon the ultimate goal to be achieved.

Also, the fluidity of a typical paste composition and more particularly, any change therein over a given period of time are much more complex variables for all practical intents and purposes than above indicated, since various fillers such as calcium carbonate, baryte, and calcined clay, and various coloring agents, such as pigments, are typically incorporated into the composition, in addition to the usual resin, plasticizer, low boiling point solvent, and gelling agent. Hence, pot life upon the formulation of such a paste is indeed quite short.

Consequently, a serious need exists in the art for an improved polyvinyl chloride resin paste composition exhibiting enhanced characteristics of fluidity and adhesiveness, which is more easily worked, which does not exhibit a marked change in fluidity upon passage of a given period of time and which will not give rise to pollution of the atmosphere.

SUMMARY OF THE INVENTION

Accordingly, it is a primary object of this invention to provide an improved paste composition comprised of a polyvinyl chloride resin.

Another object of this invention is to provide an improved polyvinyl chloride paste composition which is characterized by enhanced fluidity, longer pot life, enhanced adhesiveness and markedly improved workability.

Yet another object of this invention is to provide an improved PVC paste composition which, upon application does not evolve noxious vapors to ambient.

Other objects, features and advantages of this invention will become more apparent to those skilled in the art from the detailed description of the invention which follows.

DETAILED DESCRIPTION OF THE INVENTION

It has now unexpectedly been found that an improved polyvinyl chloride resin paste composition can be obtained, and which exhibits enhanced characteristics of fluidity and adhesiveness, the fluidity of which remaining substantially unchanged over prolonged periods of time, by incorporating into the conventional polyvinyl chloride paste compositions an N-substituted acrylamide polymer, having a degree of polymerization of between about 2 and 500, and containing from about 30 to 100 per mole percent of the N-substituted acrylamide recurring unit of the structural formula (I):

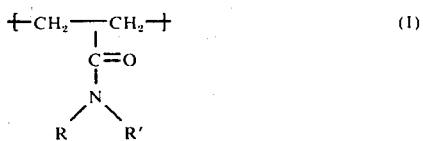

wherein R and R', respectively, are hydrogen or a lower alkyl group having from 1 to 4 carbon atoms, with the proviso that said R and R' cannot at the same time both be hydrogen.

The polyvinyl chloride paste compositions according to the present invention display the following marked advantages over the known paste compositions:

1. The acrylamide polymer additive according to this invention markedly stabilizes the subject paste compositions, and the noted typical reduction in viscosity over prolonged periods of time is greatly diminished. Thus, a highly volatile inert diluent, such as the trichloroethylene characteristically utilized for the known organosol applications, need not necessarily be present in the paste, or the same can be employed therein in greatly reduced amounts. Therefore, the compositions of the present invention are more readily and speedily workable because of the fact that any drying step [for the diluent] can be omitted, or at least greatly shortened.

2. Moreover, and further along the above lines [1], were a diluent in fact to be utilized, then it would be necessary to employ a certain recovery device to avoid environmental pollution. The paste of the present invention reduces such problems.

3. Upon treating canvases and the like with the known polyvinyl resin pastes, per se, it has come to be expected that the degree of waterproofness of the resulting products under severe practical conditions would be unsatisfactory due to insufficient impregnation or adhesion of the paste to the substrate, and, therefore, certain pretreatments of the canvas and the like with water repellents, such as certain emulsions, have to date been required. According to this invention, however, any such pretreatment can be avoided.

4. Similarly, by omitting any pretreatment to impart water repellence, the capacity of the PVC resin to be adhered to the surface of a given textile is maintained undiminished, and any such product is more amenable to being adhered by the various high frequency welding and ultrasonic bonding techniques. The presence of the acrylamide lower polymer additive greatly promotes the aforesaid improvements.

The N-substituted acrylamide polymer utilized in the present invention advantageously is a low molecular weight polymer having a degree of polymerization of between about 2 and 500, preferably between about 10 and 300, and preferably contains from between about 30 to 100 mole percent, most preferably between about 70 to 100 mole percent, of the aforementioned N-substituted acrylamide recurring unit of the structural formula (I) in order to render the same soluble in the dispersion medium.

In the event that the degree of polymerization of said N-substituted acrylamide polymer is significantly greater than about 500, then the acrylamide polymer will function as a coagulating agent, thus decreasing the stability of the pasty dispersion and effecting the coagulation thereof. This may be attributed to the phenomenon that a single molecule of the N-substituted acrylamide polymer is capable of absorbing so many of the dispersed particles in the paste as to bridge or bond them together, causing the paste to gel, lose its fluidity and even effect a phase separation.

It will in this respect be appreciated that high molecular weight N-substituted acrylamide polymers have heretofore been added to various polyvinyl chloride compositions. However, such addition of these high molecular weight polymers, as heretofore mentioned, serves only to coagulate the paste. Therefore, it too will be appreciated that this known technique markedly departs from the essence of the present invention wherein a polymer of low molecular weight necessarily must be employed.

Representative N-substituted acrylamide polymers which can be employed in the pastes of this invention can conveniently be be prepared by means of the polymerization according to known techniques of such N-substituted acrylamide monomers as N-methyl acrylamide, N,N'-dimethylacrylamide, N-ethylacrylamide, N,N'-diethylacrylamide, N-propylacrylamide, N,N'-diiosopropylacrylamide, N-butylacrylamide, and the like, or by copolymerizing such N-substituted acrylamide monomers with another comonomer copolymerizable therewith, such as styrene, vinyl acetate, vinyl chloride, ethylene, propylene, methylmethacrylate, methylacrylate, methacrylonitrile, acrylonitrile, hydroxyalkylmethacrylate, hydroxyalkylacrylate, n-butylacrylate, acrylamide, vinyl pyridine, maleic anhydride, methylvinyl ketone, vinylidene chloride, acrylic acid, N-vinyl pyrrolidone, and the like. The foregoing low molecular weight polymers can be prepared utilizing the conventional techniques for the preparation of low molecular weight polymers, for example, by conducting the polymerization in the presence of a conventional chain transfer agent.

As will be evident, the particular N-substituents, the copolymerizable comonomers and the amounts thereof, and the degree of polymerization, all depend upon the particular dispersion medium selected.

Although the amount of said N-substituted acrylamide polymer incorporated into the paste compositions of the invention is selected based upon the particular type of polyvinyl chloride resin employed, the various other components thereof, the types of fillers employed and the amounts thereof, for purposes of facile manufacture it is generally desirable to utilize an amount in the range of between about 0.05 and 10 PHR in the paste compositions. In the event that such amount is less than about 0.05 PHR, then the improved properties ascribable to the paste compositions of the invention are noticably lacking. If the amount added is in excess of about 10 PHR, then the character of the final product markedly changes. It will of course also be appreciated, however, that the amounts utilized in the compositions of the invention need not necessarily be limited to those within the above range, but rather that same depend upon the ultimate use for which the given paste composition is intended.

It is not known exactly why the low molecular weight N-substituted acrylamide polymer according to the invention provides for the improved flow characteristics of the resulting pastes, but it is theorized that said polymer functions as a protective colloid adsorbed on the surfaces of the paste resin and any filler.

Furthermore, as the reason why the adhesiveness of the polyvinyl chloride paste is enhanced by the presence of the N-substituted acrylamide polymer, it is believed that such N-substituted acrylamide polymer itself displays a noted affinity for various polymers, metals, and solvents, and that this affinity directly flows from the presence of the N-substituted amide moiety.

The paste compositions of the invention can also comprise a plasticizer, if necessary, and also an organic solvent. The typical plasticizers can be utilized. Exemplary plasticizers are the esters of phthalic acid, such as dibutyl phthalate, di-2-ethylhexyl phthalate, di-n-octyl phthalate, butyllauryl phthalate; esters of aliphatic dibasic acids, such as dioctyl adipate, dioctyl tetrahydrophthalate; phosphates such as tricresyl phosphate, octyldiphenylphosphate; polyester type plasticizers such as poly(propylene adipate), poly(porpylene sebacate); chlorine containing plasticizers, such as the chlorinated paraffins and chlorinated diphenyl; and the multicomponent low molecular weight acrylate or methacrylate copolymers.

In the event that the plasticizer employed is in and of itself capable of dissolving the N-substituted acrylamide polymer, then it is permissible to utilize such plasticizer, per se; for example, the phosphorous containing plasticizers and the chlorinated paraffins fall in this category. In the event that the plasticizer is not capable of dissolving the N-substituted acrylamide polymer, then it becomes necessary to utilize the same together with any organic solvent, desirably a non-combustible solvent, for example, a halogenated hydrocarbon such as methylene chloride, chloroform, bromoform, carbon tetrachloride, ethyl bromide, ethylene dichloride, ethylene dibromide, ethylidene dichloride, acetylene tetrachloride, acetylene dibromide, ethylene trichloride, ethylene tetrachloride, isobutyl chloride, isobutyl bromide, isoamyl chloride, isoamyl bromide, benzene chloride, benzene bromide, and the like.

The polyvinyl chloride resins themselves comprising the pastes of the invention include, in addition to the homopolymers of vinyl chloride, those vinyl chloride copolymers including a small proportion, below about 20%, of such comonomers as vinyl propionate, vinyl acetate, vinylidene chloride, vinyl fluoride, methacrylic acid, acrylic acid, methacrylate, acrylate, 1-chloro-1-propene, propylene, and the like.

The subject paste compositions can also include, if need be, an emulsion stabilizer, pigment and/or fillers.

In order to further illustrate the present invention and the advantages thereof, the following specific examples are given, it being understood that the same are intended only as illustrative and in no wise limitative.

EXAMPLE 1

The paste composition of polyvinyl chloride, as shown in Table 1, was prepared, and the chnges in viscosity thereof over those periods of time noted were observed. The results are shown in Table 2.

Table 1

| Paste Composition | |
|---|---|
| Polyvinyl chloride resin for paste [commercial name: Geon 121] | 100 parts |
| Dioctyl phthalate [plasticizer] | 80 parts |
| Calcium carbonate [commercial name: Sunlight SL-300] | 20 parts |
| Pigment [chrome yellow] | 10 parts |
| Stabilizer [compound of Cd and Ba] | 2 parts |
| Trichlene | 10 parts |
| Polymer of N-substituted acrylamide | Amount shown in Table 2 |

Blending of the components of the paste composition was carried out on a bench roll having three rollers. The polymer of N,N-dimethyl acrylamide was added as a solution in trichlene. The viscosity readings of the paste sols were taken using the BN-type Viscometer (Tokyo-Keiki Co.), with a No. 3 spindle rotating at 30 r.p.m. while maintaining the temperature of the system at 25°C.

Table 2

Change in Viscosity of the Paste Over Given Period of Time

| Sample No. | Amount of Polymer of N-substituted Acrylamide (PHR) | Viscosity of the Paste Composition (poise) | | | |
|---|---|---|---|---|---|
| | | Immediately After Preparation | After 1 Day | After 2 Days | After 5 Days |
| 1 | 0 | 53 | 79 | 106 | 143 |
| 2 | 0.3 | 38 | 35 | 43 | 50 |
| 3 | 1.0 | 28 | 30 | 31 | 31 |
| 4 | 2.0 | 25 | 26 | 26 | 27 |
| 5 | 3.0 | 26 | 26 | 28 | 27 |

It is evident from Table 2 that, by the addition of the polymer of an N-substituted acrylamide to a polyvinyl chloride paste, the change in the viscosity thereof over a given period of time is comparatively virtually nil.

The polymer of N-substituted acrylamide used in this example was prepared by the polymerization of the single monomer, N,N-dimethyl acrylamide, under the following conditions and the degree of polymerization was about 100. More particularly, a mixture of 100 parts of N,N-dimethyl acrylamide, 1 part of 2,2'-azobisisobutyronitrile and 730 parts isopropyl alcohol, placed in a reaction vessel under a nitrogen atmosphere, was heated at 60°C. for 4 hours, under agitation, and then the reaction mixture was concentrated to about 5% polymer content by the distillation of the isopropyl alcohol therefrom, and which was then poured into ethyl ether to precipitate the polymer. After drying, the homopolymer of N,N-dimethyl acrylamide was obtained.

EXAMPLE 2

Waterproof canvases were manufactured by dipping various types of canvas, such as vinylon, polyester and polyester/vinylon, into the paste composition of polyvinyl chloride prepared as in Example 1, and their properties were tested. The process of manufacture was as follows. First, each canvas was dipped in the paste composition, and then squeezed through a mangle having two rubber rollers, to provide a definite material pick-up of about 70%. After drying for five minutes at 100°C., the test pieces were further cured at 180°C. for three minutes. The waterproofness and surface adhesiveness of the resulting canvases were examined. Three factors, namely, resistance to hydraulic pressure after manufacturing, resistance to hydraulic pressure of canvas after crumpling by hand and water penetration, were tested as indicative of degree of waterproofness. The initial resistance to hydraulic pressure of a canvas just after manufacture and resistance, after crumpling, to fatigue by hand were observed by a conventional tester, and the water leak or penetration at a low pressure (50 mm $H_2O$) was observed over a long period of time. The interfacial adhesive strength between polyvinyl chloride resin and the substrate fabrics was measured on an Instron type tester, as the stress required to separate two pieces of waterproof canvas adhered to each other by a high frequency welding technique. The results are shown in Table 3.

ness of a canvas treated only with a paste of polyvinyl chloride is insufficient for the purpose intended. Furthermore, as the pretreatment of the substrate fabric to render same water repellent decreases the adhesiveness between the waterproof canvases and the polyvinyl chloride, it is certain that omitting such a pretreatment results in better adhesion between lamina by welding techniques. As shown in Table 3, it is also apparent that a waterproof canvas manufactured by the method of this invention exhibits markedly enhanced adhesiveness upon high frequency welding, even in the event that a given pretreatment for water repellency purposes is effected.

EXAMPLE 3

A paste of polyvinyl chloride having the following composition was prepared as a plastisol suitable for brush application.

| | |
|---|---|
| Polyvinyl chloride resin for paste [commercial name: Geon 121] | 100 parts |
| Tricresyl phosphate | 40 parts |
| Aliphatic acid glycol ester | 40 parts |
| Calcium carbonate, moderately oiled | 10 parts |
| Titanium dioxide [Rutile type] | 3 parts |
| Dibasic lead phosphite | 3 parts |
| Polymer of N-substituted acrylamide | Amount shown in Table 4 |

The polymer of N-substituted acrylamide used in this example was a copolymer obtained from 80 mole % of N,N-diisopropyl acrylamide and 20 mole % of butyla- Table 3

Degree of Waterproofness of PVC Dip-Coated Canvas, and Peel Strength of Joint Adhered Together by High Frequency Welding Technique

| Sample No. | Substrate Fabric | Pre-treatment | Amount of polymer of N-substituted acrylamide (PHR) | Degree of Waterproofness | | | Peel Strength of Joint (Kg/3 cm width) |
|---|---|---|---|---|---|---|---|
| | | | | Water Resistance Immediately after Manufacture (mm $H_2O$) | Resistance after Crumpling (mm $H_2O$) | Leakiness (days) | |
| 1 | Vinylon | none | 0 | 900 | 800 | leaked after 2 days | 5.0 |
| 2 | Polyester | none | 0 | 800 | 750 | | 4.8 |
| 3 | Polyester/Vinylon | none | 0 | 850 | 750 | | 5.0 |
| 4 | Vinylon | none | 3.0 | >1500 | >1500 | did not leak for 7 days | 6.5 |
| 5 | Vinylon | none | 10.0 | >1500 | >1500 | | 7.8 |
| 6 | Polyester | none | 3.0 | >1500 | >1500 | | 6.1 |
| 7 | Polyester | none | 10.0 | >1500 | >1500 | | 7.0 |
| 8 | Polyester/Vinylon | none | 3.0 | >1500 | >1500 | | 6.8 |
| 9 | Polyester/Vinylon | none | 10.0 | >1500 | >1500 | | 7.1 |
| 10 | Polyester/Vinylon | none | 20.0 | >1500 | >1500 | | 8.0 |
| 11 | Vinylon | yes | 0 | >1500 | >1500 | | 3.8 |
| 12 | Vinylon | yes | 3.0 | >1500 | >1500 | | 5.3 |
| 13 | Vinylon | yes | 10.0 | >1500 | >1500 | | 6.5 |

From Table 3, it is apparent that the addition of a small amount of the polymer of the N-substituted acrylamide having a low degree of polymerization to the paste of polyvinyl chloride considerably improves the waterproofness and the adhesive properties of the waterproofed canvas. It will be borne in mind, as an especial advantage of this invention, that if the paste composition of the invention is utilized for the preparation of a waterproof canvas, it thus becomes unnecessary to preliminarily treat the substrate fabric with an anti-wetting or water repellent agent, which pretreatment is generally carried out because the degree of waterproofcrylate, and its degree of polymerization was 63, determined by osmometry.

The viscosity change upon passage of time, suitably for coating on a steel sheet by brushing and the adhesiveness of the coated layer of the above composition were examined, as shown in Table 4, where the adhesive performance of the coated film on the steel sheet were evaluated subjectively, by examining the state of the coated film, having dipped the same in water for three days after it had been punctured with a knife.

The Geon 121 resin employed in the above examples is a commercially available polyvinyl chloride resin having the following general properties:

Vinyl chloride: 100% (no copolymer)
Degree of polymerization: 1650
Diameter of particles (200 mesh pass): more than 90%
Specific viscosity (Goodrich method): 0.57–0.63

Further information and clarification with respect to the chemcial nature of the aforementioned Geon 121 resin is available in Zimmerman and Lavine, *Handbook of Material Trade Names*, Supplement 4 (1965) pages 132 to 133.

Table 4

| Sample No. | Amount of Polymer of N-substituted Acrylamide (PHR) | Viscosity of Paste (centipoise) Immediately after Preparation | Viscosity of Paste (centipoise) After 4 days | Workability for brush coating | Adhesive condition of the coated film |
|---|---|---|---|---|---|
| 1 | 0 | 4200 | 6100 | poor | poor |
| 2 | 0.1 | 3200 | 3800 | fair | good |
| 3 | 0.5 | 2500 | 2800 | good | good |
| 4 | 1.0 | 2200 | 2300 | good | good |
| 5 | 3.0 | 2100 | 2000 | good | good |
| 6 | 10.0 | 3900 | 4100 | fair | fair |

As shown in Table 4, it is obvious that the flow properties of the composition and the stability thereof over the time period indicated were considerably improved, and, furthermore, its adhesiveness to the steel sheet was also improved markedly.

While the invention has been described and illustrated with reference to certain preferred embodiments thereof, those skilled in the art will appreciate that various changes, modifications and substitutions therein can be made without departing from the spirit of the invention. It is intended, therefore, that the invention be limited only by the scope of the claims which follow.

What is claimed is:

1. In a paste composition comprising particles of a polyvinyl chloride resin dispersed in an organic vehicle, the improvement which comprises, as a component thereof, from about 0.05 to 10 PHR of a low molecular weight N-substituted acrylamide polymer having a degree of polymerization of between about 2 and 500, and comprising between about 30 to 100 mole percent of the acrylamide recurring unit having the structural formula:

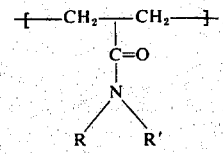

wherein R and R' are either hydrogen or lower alkyl having from 1 to 4 carbon atoms, and wherein R and R' together cannot both be hydrogen.

2. The paste composition as defined by claim 1, wherein both R and R' are lower alkyl having from 1 to 4 carbon atoms.

3. The paste composition as defined by claim 1, wherein the low molecular weight N-substituted acrylamide polymer has a degree of polymerization of between about 10 and 300.

4. The paste composition as defined by claim 3, wherein the low molecular weight N-substituted acrylamide polymer comprises between about 70 to 100 mole percent of the acrylamide recurring unit.

5. The paste composition as defined by claim 4, wherein the low molecular weight N-substituted acrylamide polymer is a polymer of a monomer selected from the group consisting of N-methyl acrylamide, N,N'-dimethylacrylamide, N-ethylacrylamide, N,N'-diethylacrylamide, N-propylacrylamide, N,N'-diisopropylacrylamide and N-butylacrylamide.

6. The paste composition as defined by claim 4, wherein the low molecular weight N-substituted acrylamide polymer is a copolymer of the acrylamide monomer with a comonomer selected from the group consisting of styrene, vinyl acetate, vinyl chloride, ethylene, propylene, methylmethacrylate, methylacrylate, methacrylonitrile, acrylonitrile, hydroxyalkylmethacrylate, hydroxyalkylacrylate, n-butylacrylate, acrylamide, vinyl pyridine, maleic anhydride, methylvinyl ketone, vinylidene chloride, acrylic acid and N-vinyl pyrrolidone.

7. The paste composition as defined by claim 4, wherein the polyvinyl chloride resin comprises vinyl chloride homopolymer.

8. The paste composition as defined by claim 4, wherein the polyvinyl chloride resin comprises a copolymer of vinyl chloride monomer with a comonomer selected from the group consisting of vinyl propionate, vinyl acetate, vinylidene chloride, vinyl fluoride, methacrylic acid, acrylic acid, methacrylate, acrylate, 1-chloro-1-propene and propylene.

9. The paste composition as defined by claim 4, further comprising at least one member selected from the group consisting of a plasticizer, a filler, an organic solvent, a coloring agent, an emulsion stabilizer, and any mixture thereof.

10. The method of enhancing the fluidity, pot life, adhesiveness and workability of a polyvinyl chloride paste composition comprising particles of a polyvinyl chloride resin dispersed in an organic vehicle, which comprises incorporating therein, in an amount ranging from about 0.05 to 10 PHR, a low molecular weight N-substituted acrylamide polymer as defined in claim 1.

* * * * *

UNITED STATES PATENT OFFICE
CERTIFICATE OF CORRECTION

PATENT NO. : 3,956,222
DATED : May 11, 1976
INVENTOR(S) : HIROSHI ABE, KOICHI KAZITANI, KOICHI SAITO, and HISASHI NAKAMOTO It is certified that error appears in the above-identified patent and that said Letters Patent are hereby corrected as shown below:

In the ABSTRACT, at column 3, lines 15-20; and, in Claim 1;

For 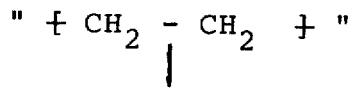 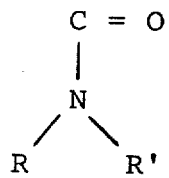 read 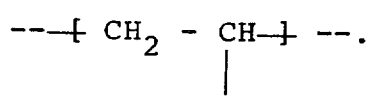 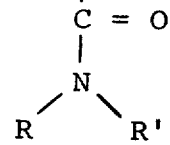

Signed and Sealed this

Fourteenth Day of September 1976

[SEAL]

Attest:

RUTH C. MASON
*Attesting Officer*

C. MARSHALL DANN
*Commissioner of Patents and Trademarks*